(12) United States Patent
Romanov

(10) Patent No.: US 11,584,051 B2
(45) Date of Patent: Feb. 21, 2023

(54) DEVICE AND METHOD FOR PRODUCING A PARTICLE FOAM PART

(71) Applicant: Kurtz GmbH, Kreuzwertheim (DE)

(72) Inventor: Victor Romanov, Wertheim (DE)

(73) Assignee: Kurtz GmbH, Kreuzwertheim (DE)

( * ) Notice: Subject to any disclaimer, the term of this patent is extended or adjusted under 35 U.S.C. 154(b) by 1009 days.

(21) Appl. No.: 16/070,639

(22) PCT Filed: Jan. 18, 2017

(86) PCT No.: PCT/EP2017/050943
§ 371 (c)(1),
(2) Date: Jul. 17, 2018

(87) PCT Pub. No.: WO2017/125412
PCT Pub. Date: Jul. 27, 2017

(65) Prior Publication Data
US 2021/0206037 A1    Jul. 8, 2021

(30) Foreign Application Priority Data

Jan. 18, 2016 (DE) ..................... 10 2016 100 690.4
Aug. 5, 2016 (DE) ..................... 20 2016 104 341.7

(51) Int. Cl.
*B29C 44/58* (2006.01)
*B29C 44/44* (2006.01)
(Continued)

(52) U.S. Cl.
CPC ........ *B29C 44/445* (2013.01); *B29C 44/3426* (2013.01); *B29C 44/58* (2013.01);
(Continued)

(58) Field of Classification Search
CPC ................................................ B29C 35/0805
See application file for complete search history.

(56) References Cited

U.S. PATENT DOCUMENTS 3,015,851 A    1/1962 Wiles
3,060,513 A    10/1962 Klink et al.
(Continued)

FOREIGN PATENT DOCUMENTS

CN    103974813    8/2014
DE    21 22 482    11/1971
(Continued)

OTHER PUBLICATIONS

Search Report of German Patent Application No. 10 2016 100 690.4 dated Apr. 28, 2016 filed Jan. 18, 2016.
(Continued)

*Primary Examiner* — Jacob T Minskey
*Assistant Examiner* — Adrien J Bernard
(74) *Attorney, Agent, or Firm* — HoustonHogle LLP

(57) ABSTRACT

The invention relates to a method and a device for producing a particle foam part. The device comprises a molding tool (3) which delimits a molding chamber (14), wherein at least two capacitor plates (15, 16) are arranged adjacently to the molding chamber, said plates be connected to an RF radiation source. The RF radiation source is designed to dispense RF radiation, and the molding tool (3) has means for controlling the temperature of the molding tool in the region of an inner delimiting surface (19) delimiting the molding chamber (14) and/or for supplying a heating medium to the molding tool region lying against the inner delimiting surface.

24 Claims, 13 Drawing Sheets

Figure 1:
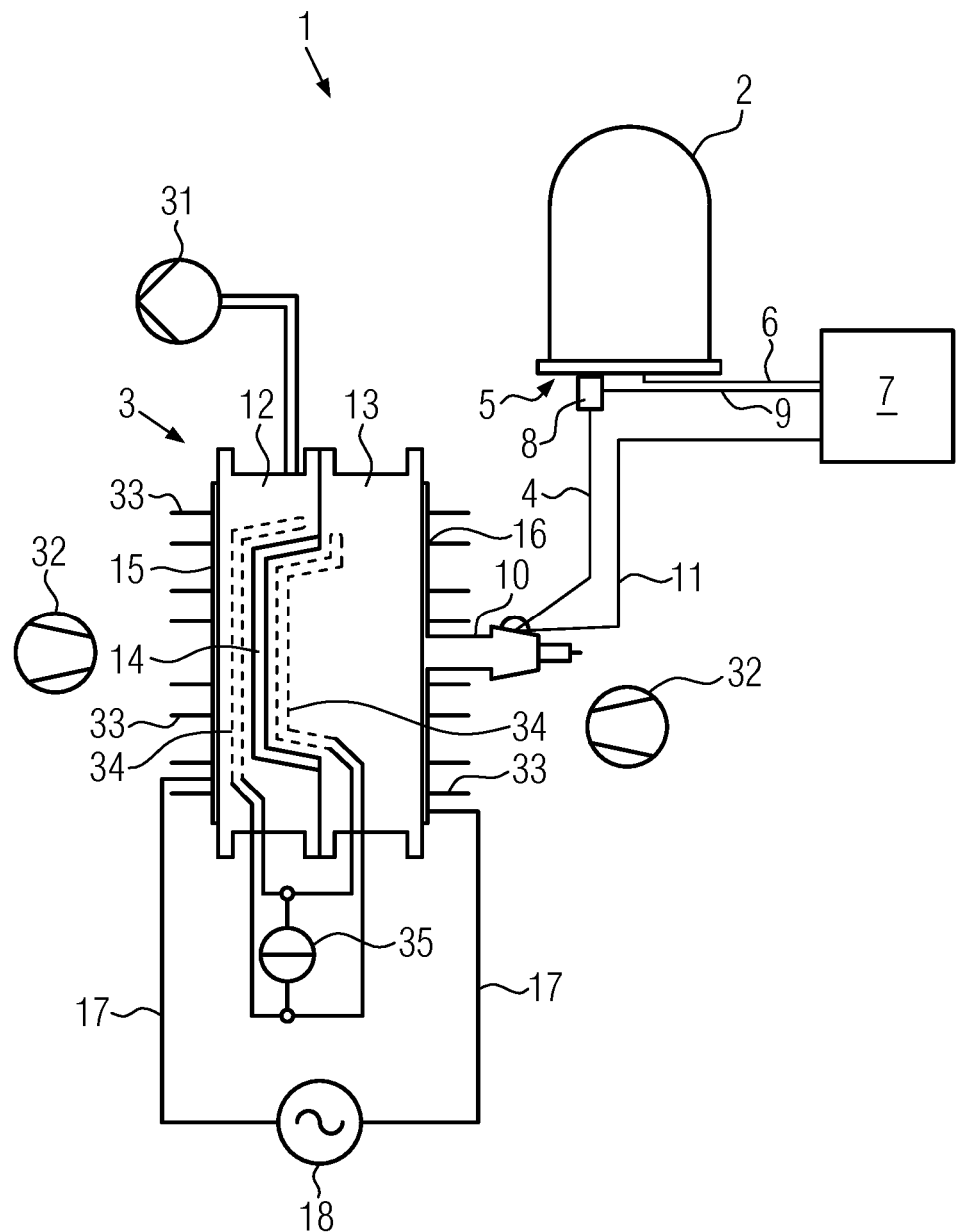
Figure 2:
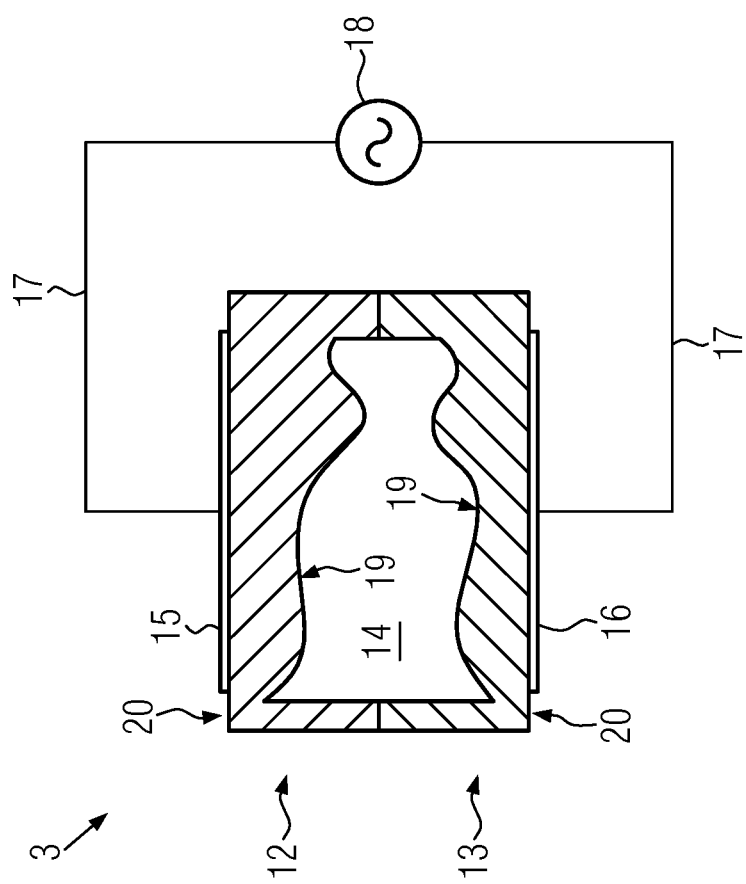

(51) Int. Cl.
B29C 44/34 (2006.01)
*B29C 35/08* (2006.01)
*B29K 75/00* (2006.01)

(52) U.S. Cl.
CPC ...... *B29C 35/0805* (2013.01); *B29C 44/3415* (2013.01); *B29C 2035/0861* (2013.01); *B29K 2023/06* (2013.01); *B29K 2075/00* (2013.01); *B29K 2867/003* (2013.01)

(56) References Cited

U.S. PATENT DOCUMENTS

| | | | |
|---|---|---|---|
| 3,242,238 | A | 3/1966 | Edberg et al. |
| 3,331,899 | A | 7/1967 | Immel |
| 4,851,167 | A | 7/1989 | Marc |
| 5,082,436 | A | 1/1992 | Choi et al. |
| 5,128,073 | A * | 7/1992 | Allen .................. B29C 44/3415 264/417 |
| 5,139,407 | A | 8/1992 | Kim et al. |
| 5,516,470 | A | 5/1996 | Larsson |
| 5,973,308 | A | 10/1999 | Sternowski |
| 6,241,929 | B1 | 6/2001 | Akopyan |
| 6,358,459 | B1 | 3/2002 | Ziegler et al. |
| 10,645,992 | B2 | 5/2020 | Le et al. |
| 2009/0243158 | A1 | 10/2009 | Plaksunov et al. |
| 2011/0068511 | A1 | 3/2011 | Sowden et al. |
| 2011/0206926 | A1 | 8/2011 | Marc |
| 2014/0225314 | A1 * | 8/2014 | Kurihara .................. B29C 35/02 264/479 |
| 2014/0243442 | A1 | 8/2014 | Coles et al. |
| 2016/0039157 | A1 | 2/2016 | Huang et al. |
| 2016/0227876 | A1 | 8/2016 | Le et al. |
| 2017/0095986 | A1 * | 4/2017 | Feigenblum ........ B29C 35/0805 |

FOREIGN PATENT DOCUMENTS

| | | |
|---|---|---|
| DE | 198 60 611 C1 | 3/2000 |
| DE | 199 21 742 | 11/2000 |
| DE | 10117979 A1 | 8/2002 |
| DE | 102013012515 | 3/2014 |
| DE | 10 2014 207 580 | 10/2015 |
| DE | 10 2014 1 17 332 | 6/2016 |
| DE | 10 2015 202 013 A1 | 8/2016 |
| EP | 1 990 170 A2 | 11/2008 |
| EP | 2724834 A1 * | 4/2014 ............. A47C 27/14 |
| GB | 1318230 | 5/1973 |
| GB | 1403326 | 8/1975 |
| JP | 2016-74106 A | 5/2016 |
| KR | 10 2014 0090995 | 7/2014 |
| WO | WO 0164414 | 9/2001 |
| WO | WO 2004103687 | 12/2004 |
| WO | WO 2013005081 | 1/2013 |
| WO | WO 2014128214 | 8/2014 |

OTHER PUBLICATIONS

International Search Report of the International Searching Authority, dated Apr. 24, 2017, from International Application No. PCT/EP2017/050943, filed on Jan. 18, 2017. 7 pages.
Written Opinion of the International Searching Authority, dated Apr. 24, 2017, from International Application No. PCT/EP2017/050943, filed on Jan. 18, 2017. 8 pages.
Office Action dated Jan. 29, 2021 of Chinese Patent Application No. 201780007212.4, filed Jan. 18, 2017. 12 pages.
Notification of First Office Action dated Jan. 22, 2020 of Chinese Patent Application No. 201780007212.4 filed Jan. 18, 2017.
Notification of Second Office Action dated Aug. 17, 2020 of Chinese Patent Application No. 201780007212.4 filed Jan. 18, 2017.
International Preliminary Report on Patentability, dated Jul. 24, 2018, from International Application No. PCT/EP2017/050943, filed on Jan. 18, 2017. 15 pages.
Examination Report dated Feb. 26, 2020 from EP 177009545, filed on Jan. 18, 2017. 11 pages.
Examination Report of German Patent Application No. 10 2016 100 690.4 dated Jun. 19, 2019 filed Jan. 18, 2016.
International Preliminary Report on Patentability, dated Jul. 24, 2018, from International Application No. PCT/EP2017/050940, filed on Jan. 18, 2017. 17 pages.
International Search Report of the International Searching Authority, dated Apr. 25, 2017, from International Application No. PCT/EP2017/050940, filed on Jan. 18, 2017. 12 pages.
Notification of First Office Action dated Dec. 13, 2019 of Chinese Patent Application No. 201780007213.9, filed Jan. 18, 2017. 19 pages.
Written Opinion of the International Searching Authority, dated Apr. 25, 2017, from International Application No. PCT/EP2017/050940, filed on Jan. 18, 2017. 8 pages.

* cited by examiner

DEVICE AND METHOD FOR PRODUCING A PARTICLE FOAM PART

RELATED APPLICATIONS

This application is a § 371 National Phase Application of International Application No. PCT/EP2017/050943, filed on Jan. 18, 2017, now International Publication No. WO 2017/125412, published on Jul. 27, 2017, which International Application claims priority to German Application 10 2016 100 690.4, filed on Jan. 18, 2016, and German Application 20 2016 104 341.7, filed on Aug. 5, 2016, all of which are incorporated herein by reference in their entirety.

This invention concerns a device and a process for producing a particle foam part.

WO 2013/05081 A1 discloses a process for producing particle foam parts, in which a mixture of foam particles and dielectric transfer liquid is heated by means of electromagnetic waves to fuse the foam particles into a particle foam part. Radio waves or microwaves are used as electromagnetic waves. The material of the foam particles is made of polypropylene (PP).

U.S. Pat. No. 3,060,513 discloses a process for sintering moist thermoplastic foam particles. The particles are dielectrically heated and simultaneously compressed in the molding tool. Electromagnetic waves are applied at a frequency of about 2 to 1000 MHz.

A similar process is described in U.S. Pat. No. 3,242,238, in which foam particles are moistened with an aqueous solution and exposed to an electromagnetic field with a frequency of about 5 to 100 MHz.

GB 1,403,326 describes a process for fusing expandable polystyrene foam particles, in which the particles are moistened with an aqueous solution and exposed to an electromagnetic field of 5 to 2000 MHz.

WO 01/64414 A1 discloses another process in which polymer particles of polyolefins wetted with a liquid medium are heated with electromagnetic waves, particularly particular microwaves. The temperature in the molding tool is controlled by controlling the pressure inside.

In the processes described above, moist foam particles are heated with electromagnetic waves, whereby the electromagnetic energy is absorbed by the liquid and transferred to the particles.

U.S. Pat. No. 5,128,073 discloses thermoplastic particles coated with a high-frequency energy absorbing material. These particles can be heated with electromagnetic waves, whereby the coating gives up the electromagnetic energy and releases it onto the foam particles. Electromagnetic waves in the range from 40 MHz to 2450 MHz are used to fuse the foam particles.

These processes have been known for decades. Nevertheless, they were not able to assert themselves in practice. There are various reasons for this. These methods work very well for laboratory samples. However, the transition to industrial production has not yet been suc-cessful. An important reason for this is that the heat cannot be introduced evenly into the foam particles. This prevents uniform fusing in the particle foam part.

In practice, therefore, foam particles are almost exclusively fused using saturated dry steam, as is known from WO 2014/128214 A1, for example. Compared to fusing with steam, fusing with electromagnetic waves has never been able to establish itself in practice, although the fusing of electromagnetic waves would have considerable advantages due to the principle. With electromagnetic waves, the energy could be transmitted much more precisely, so that it would not be necessary to heat auxiliary bodies. When steam is used, it must first be generated in a steam generator. Then the steam must be fed to the tool via pipes. All these parts must be heated to a sufficiently high temperature so that the steam does not condense in them. This causes a considerable heat loss. In addition, the devices for steam generation and steam pipe take up most of the installation chamber on the device for producing the particle foam part. If no steam were required to fuse the foam particles, the entire device could be made much more compact.

The invention is based on the task of creating a device and a process for producing of a particle foam part with which expandable thermoplastic foam particles can be fused efficiently and reliably.

The object is achieved according to the invention by the subject matter of the independent claims. Advantageous embodiments are indicated in the following description.

A device for producing a particle foam part according to a first aspect of the present invention comprises a molding tool which defines a molding chamber, wherein at least two capacitor plates are arranged adjacently to the molding chamber, said plates being connected to an RF radiation source. The RF radiation source is designed to dispense RF radiation, and the molding tool has means for controlling the temperature of the molding tool in the region of an inner delimiting surface which delimits the molding chamber and/or for supplying a heating medium to the molding tool region lying against the inner delimiting surface.

These means for tempering the area of the delimiting surface of the molding chamber of the molding tool or for supplying a heating medium serve for the additional heating of foam particles located in the molding chamber. This can compensate for uneven heating of the foam particles when fusing the foam particles to the particle foam part. When heat is introduced by means of electromagnetic radiation, particularly RF radiation but also microwave radiation, the most intensive energy is generally introduced into the interior of the molding chamber and not into the edge area of the molding chamber. In addition, the foam particles are very good heat insulators, which is why the heat is distributed only slowly between the foam particles. Especially at the edges of the particle foam parts considerable temperature differences can occur. These temperature differences can be compensated by the additional temperature control of the molding tool or the foam particles or the fused particle foam parts at the edge of the molding chamber, whereby an even fusing of the particle foam parts is achieved. This edge area usually comprises one, two or a few layers of foam particles of the particle foam part.

Electromagnetic RF radiation preferably has a frequency of at least 30 KHz or at least 0.1 MHz, particularly at least 1 MHz or at least 2 MHz preferably at least 10 MHz.

Electromagnetic RF radiation preferably has a maximum frequency of 300 MHz.

The foam particles can consist of a uniform material or homogeneous material.

The foam particles can be compressed in the molding tool. Compression here means that the foam particles are mechanically compressed without the effect of thermal expansion, which occurs in the molding tool due to the heating required for fusing. The foam particles can be compressed, for example, by filling the molding tool with foam particles under pressure or counterpressure. Compression can also take place by pressing together two halves of the molding tool already filled with foam particles. Such molding tools, which have compressible mold halves when filled, are called cracking gap molding tools.

The temperature of the foam particles in the molding tool is preferably measured. The supply of heat by means of electromagnetic RF radiation can be controlled as a function of the measured temperature. The temperature measurement can be carried out by means of electrical temperature sensors as well as fiber-optic temperature sensors.

The molding post or molding chamber delimiting surface of the tool can be tempered. Depending on the size of the particle foam part to be produced and depending on the plastic material used, different temperatures can be set. The molding tool is preferably tempered to a temperature in the range of approx. 50° C. to approx. 150° C.

After fusing the foam particles to the particle foam part, this one can be stabilized. Stabilization is achieved by holding the particle foam part in the tool, whereby the tool is not opened and the shape of the molding post is maintained unchanged. During stabilization, the heat can be evenly distributed within the particle foam part and the particle foam part can also cool down slowly.

Preferably a vacuum is applied to the molding tool before, during and/or after fusing. This mainly removes moisture from the molding post and the plastic material to be fused.

The molding tool is preferably made of a material that is essentially transparent to the electromagnetic RF radiation used, such as polytetra-fluoroethylene (PTFE), polyethylene, particularly UHMWPE, polyetherketone (PEEK) and other materials transparent to RF radiation.

The molding tool can be made of different materials. Particularly, a layer of a material having a loss factor similar or equal to that of the expandable polymeric material to be processed with the molding tool may be provided adjacent to the surface or the molding chamber delimiting surface of the molding tool. This heats the molding tool in the area of its delimiting surface similar to the polymer material to be expanded.

Different loss factors are also understood as similar or identical electrical loss factors of the material of the molding tool and of the expandable polymer material to be processed, provided that they lead to a substantially identical or similar change in temperature under the influence of electromagnetic radiation due to the different heat capacity of the material forming the molding tool and the expandable polymer material. The molding tool is usually made of a non-porous or slightly porous material with a much higher density than the normally pre-expandable polymer particles. Such a dense material usually has a much higher heat capacity than a foamed material. As a result, it requires considerably more heat per volume to achieve a temperature increase similar to that of a foamed polymer material. On the other hand, the absorption of electromagnetic radiation is much higher with a denser material than with a non-dense foamed material. The effects of the higher absorption due to the higher density and the higher heat capacity due to the higher density do not always cancel out ex-actly, so that materials of the molding tool which have a merely similar, but different electrical loss factor than the expandable polymer material to be processed, when exposed to electromagnetic radiation, can lead to an essentially equal increase in temperature. Therefore, in the sense of the present invention, "similar electrical loss factors" are also understood to mean different loss factors which, due to the different density effects (heat capacity, absorption of electromagnetic radiation), lead to substantially the same or only slightly different temperature changes.

Since the electrical loss factor can also be temperature-dependent, the corresponding materials must be matched for certain temperature ranges. These temperature ranges are mainly those in which the fusing of the foam particles is carried out. These temperature ranges are usually slightly above the softening or melting temperature of the material of the foam parti-Iles. The coordination of the materials can be carried out by simple tests in which heat is supplied to the materials by means of electromagnetic radiation and whose temperature is recorded over time. To individually match the materials of the molding tool, it is also possible to provide layers of materials with different electrical loss factors. In this way, both the electrical loss factor and the mechanical strength can be adapted to the respective requirements.

Two or more capacitor plates are provided for generating the electromagnetic RF radiation, which are arranged on a molding tool otherwise made of an electrically insulating material. A high-frequency voltage with an amplitude of at least 1 kV, preferably at least 10 kV and particularly at least 20 kV is applied to the capacitor plates.

The molding tool can have different thicknesses in the area between the respective capacitor plates, so that the molding chamber is limited by three-dimensional contoured inner delimiting surfaces. This makes it possible to produce three-dimensionally contoured particle foam parts. A three-dimensional contoured delimiting surface is a surface that is not a flat surface. Such a molding tool design is particularly advantageous for producing particle foam parts, which have essentially the same density of foam particles everywhere. Such a design is particularly useful if the molding tool has the same or a similar loss factor as the expanding polymer material to be processed, as then, regardless of the thickness of the particle foam parts to be produced, essentially the same temperature is set everywhere when electromagnetic waves are applied. In molds that do not absorb the electromagnetic waves, the areas in which the particle foam part to be produced has a greater thickness or a greater density than in other areas would be heated more strongly.

According to a preferred design, the molding tool has a porous molded body that forms at least a portion of the inner delimiting surface and communicates with a device for supplying a heating fluid. Hot steam is used as heating fluid, for example. By supplying hot steam in the porous molded body, the porous molded body itself is tempered and steam can pene-trate through the pores of the porous molded body into the molding chamber and heat the surface area of the foam part to be produced with the molding tool. The porous shaped body is designed in such a way that the heated fluid can evenly escape over the area of the shaped body. However, the flow cross-section formed through the pores of the molding body is much smaller than with conventional molding tools, with which the foam particles are heated exclusively with steam. This porous shaped body serves only for the superficial supply of heat to the particle foam part.

The molding tool can have at least one channel for supplying or passing a heating fluid. This allows the molding tool itself to be tempered. However, the channel can also be connected to openings leading into the molding chamber, as in the porous molding body described above, so that the heating fluid enters the molding chamber. It is preferred when various openings are provided, which are distributed over the delimiting surface, so that the surface of the particle foam part is heated evenly even with a low flow of the heating fluid.

With the designs described above, steam, especially steam, can be fed into the molding chamber. The water fed into the molding chamber can also absorb the RF radiation and convert it into heat. However, the amount of heating fluid supplied is preferably so small that the foam particles are heated primarily by the direct absorption of RF radiation. Preferably, the amount of heat supplied by direct absorption of RF radiation is at least 50% of the total amount of heat supplied to the tool chamber, preferably at least 75% of the total amount of heat supplied to the molding chamber and particularly at least 90% of the total amount of heat supplied to the molding chamber.

Another way of tempering the inner delimiting surface of the molding tool is to provide the inner delimiting surface with a layer of a material that is not transparent to RF radiation. This layer is called a passive heating layer. The passive heating layer can be made of a temperature-stable material that is not transparent to RF radiation. Suitable materials are corresponding plastics or ferrites.

For tempering the inner delimiting surface of the molding tool, an electric heating device can be arranged alternatively or additionally adjacent to the inner delimiting surface of the molding tool in the molding tool. The electric heating device preferably has one or more heating wires which are arranged adjacent to the inner delimiting surface of the molding tool. The heating wires can be arranged in zigzag or wavy lines so that a flat area of the delimiting surface can be heated with a single heating wire. The heating wire(s) are connected to a power source with which a current can be applied to heat the heating wires.

The heating wires can also be used to measure the temperature of the molding tool in the range of the inner surface. For this purpose, a heating wire is preferably used, whose electrical resistance changes strongly in the temperature range of 60 to 250° C. relevant here.

During the application of the RF radiation, the heating wire(s) is/are separated from the power source as far as possible so that no uncontrolled currents can flow through the RF radiation in the circuit closed by the power source. The RF radiation can nevertheless cause an alternating charge shift in the heating wire(s), which causes a certain heating of the heating wires. This must be taken into consideration when tempering the molding chamber. Preferably, the heating wires are arranged in equipotential surfaces of the RF radiation, so that no currents are induced in the heating wire(s). These equipotential surfaces generally run parallel to the capacitor plates.

With the additional heating of the edge area of the particle foam parts it can be ensured that the particle foam part in the range of the surface is reliably fused by the additional heating.

By additionally heating the inner delimiting surface of the molding tool, it is also possible to heat the molding tool to a predetermined, reproducible starting temperature before the actual fusing or sintering process, so that the production of each particle foam part begins at the same temperature as the inner delimiting surface of the molding tool. This can considerably stabilize the manufacturing process of the particle foam parts. If the molding tool has already been heated from fusing or sintering processes carried out immediately before, then no or only a small preheating is necessary, whereas a molding tool at room temperature must first be heated to the starting temperature. The starting temperature is typically in the range of 10° C. to 50° C. below the softening temperature of the material to be fused.

Such skin formation can also be produced alternatively by inserting a film into the molding tool, whereby the film is fused with the particle foam part and forms a layer bounding the surface. The film has a higher density than the foam particles, which means that the film absorbs more electromagnetic RF radiation than the foam particles. This causes the film to heat up more strongly and fuses with the outer foam particles of the particle foam part. The film is preferably made of the same material as the foam particles or a material which has a similar softening temperature as the material of the foam particles.

The capacitor plates of the molding tool can be adapted to the contour of the inner delimiting surfaces of the molding tool. The distance between the capacitor plates facing each other is preferably about the same everywhere. By adapting the capacitor plates to the contour of the inner delimiting surfaces of the molding tool, the distance between the two capacitor plates can be kept small, although particle foam parts are formed, which are three-dimensionally contoured and can extend considerably in all three spatial directions. This applies particularly to shell-shaped bodies, such as boxes, spherical segment shells and the like.

The capacitor plates may have a three-dimensional contoured shape, a portion of the capacitor plates facing an area of the molding chamber in which, in use, the foam particles are more densified than in another area further away from the molding chamber than a portion of the capacitor plates facing an area of the molding chamber in which the foam particles are less densified. It has been shown that the denser the foam particles are compressed in the molding chamber, the more energy they absorb. This can cause different heating. In this design, this is counteracted by shaping the electromagnetic field by adjusting the distance between different sections of the capacitor plates so that the electromagnetic field has a lower intensity in the area of higher compression of foam particles than in an area with lower compression of the foam particles.

The capacitor plates can be one-piece and three-dimensionally contoured. However, the capacitor plates can also consist of several segments. The several segments can be adjusted independently of each other in the distance to the molding chamber. This setting can be repeated, with corresponding fixing elements for fixing the position of the sections of the capacitor plates. The adjustment can also be made once, whereby the sections of the capacitor plates or elements arranged on them, e.g. rods, are cast into a plastic body.

The capacitor plates can also be used for targeted cooling of the molding tool after the production of a particle foam part. Preferably, the capacitor plates have cooling elements. The cooling elements can be cooling fins, which are actively supplied with cooling air by a fan. The cooling elements can alternatively or additionally be cooling lines which are coupled to the capacitor plates. A cooling medium, such as water or oil, is passed through the cooling lines to cool the capacitor plates if necessary. The capacitor plates can also be automatically brought into contact with the bodies of the molding tool using an adjusting device, so that the heat contained in the bodies of the molding tool is dissipated via the capacitor plates. During heating, the capacitor plates can be lifted off these bodies to prevent unwanted cooling of the bodies of the molding tool.

Cooling of the molding tool by means of the capacitor plates can be controlled by measuring the temperature of the molding tool in a closed control loop. The heating wire explained above can be used as temperature sensor.

With the device described above, particle foam parts can be produced by heating foam particles in a molding tool so that they fuse to the particle foam part. Heat is supplied to the foam particles by means of electromagnetic RF radiation. The foam particles can be made of a material that absorbs the RF radiation sufficiently so that they heat up to such an extent that they are fused. However, a heat transfer medium, such as water, may also be provided between the foam particles, which absorbs the electromagnetic radiation and heats up to such an extent that the foam particles are fused together. For materials such as ePP (expandable polypropylene) or ePS (expandable polystyrene), for example, it is advisable to add such a heat transfer medium because these materials absorb electromagnetic radiation only slightly.

The electromagnetic radiation is preferably supplied as RF radiation. In principle, especially with small particle foam parts, microwave radiation can also be used. A disadvantage of microwave radiation is that microwaves form standing waves, so that locally different amounts of heat are introduced. This is particularly disadvantageous for larger particle foam parts, as the heat input within the range of the nodes of the standing waves is often low and these are not completely fused. The use of a dielectric heat transfer medium, such as water, is also disadvantageous. With certain polymer materials, however, it is necessary to be able to carry out a fuse.

If the foam particles are heated primarily by direct absorption of the RF radiation, i.e. that the heat is not or only to a small extent heated by a heat-conveying medium, such as water, which absorbs the RF radiation and emits it to the foam particles, then temperatures of over 160° C., particularly over 170° C. or over 180° C. and preferably over 200° C. can be generated in the molding tool and the foam particles can be fused to these temperatures. This makes it possible to fuse foam particles of expandable polymer materials which could not be fused using a conventional process, as known from WO2014/128214 A1, in which the heat is transferred by saturated dry steam. This makes it possible to produce particle foam parts from materials that could not be fused using conventional processes that fuse the foam particles with steam. Completely new possibilities for producing particle foam parts are opened up and particle foam parts with previously unknown properties can be produced.

The heating of foam particles mainly by direct absorption of RF radiation, i.e. that the heat is not or only to a small extent transferred via a heat-mediating dielectric medium, such as water, which absorbs RF radiation and emits it to the foam particles, is hereinafter referred to as "direct heating".

The electrical loss factor is temperature-dependent for certain polymer materials. The higher the temperature, the higher the electrical loss factor. With materials such as ePES (expandable polyethersulfone) or expandable polyamide, the temperature dependence of the electrical loss factor is very pronounced. For such materials, it may be useful to preheat them before heating them by direct heating. Such preheating can take place by supplying steam, particularly saturated dry steam, by adding a dielectric heat transfer agent, such as water, which absorbs the electromagnetic radiation and leads to preheating of the foam particles. Preheating with a dielectric heat transfer medium is particularly efficient, as the electromagnetic radiation, particularly the electromagnetic RF radiation, can be used both for preheating with the heat transfer medium and for direct heating, in which the foam particles are fused.

In the case of direct heating, it is advisable to control the supply of heat by means of electromagnetic radiation. This control can be carried out, for example, based on a temperature recorded in the molding chamber by means of a temperature sensor. This temperature sensor is preferably a fiber-optic temperature sensor. However, the heat supplied can also be measured based on the electrical power output or voltage changes at the capacitor. The electrical losses increase the more power is drawn or the greater the electrical loss factor of the plastic material to be fused. In the case of large electrical losses, the maximum electrical power of a generator for electromagnetic waves, particularly RF radiation, can be called up. With a further increase of the electrical losses, the voltage is then reduced by a control device of the generator to prevent an overload of the generator. By detecting the voltage at the capacitor, it can be determined whether the device is operated in a normal load state or in a limit load state. In limit load condition, the power input corresponds to the maximum power of the generator.

In principle, the electrical power is determined by the voltage and current which are present or flowing at the capacitor. These can be measured and the electrical power corresponding to the heat output can be determined from this.

For a better understanding of the invention, its operating advantages and specific objects attained by its uses, reference is made to the accompanying drawings and descriptive matter in which preferred embodiments of the invention are illustrated.

FIG. 1 schematically shows an example of a device for producing a particle foam part, FIGS. 2 to 6 schematically show each time different tools for a device for producing a particle foam part in a cross-sectional view, FIGS. 7a to 7k show a particle foam part produced by fusing with RF radiation.

A device 1 for producing a particle foam part comprises a material container 2, a molding tool 3 and a line 4 leading from the material container 2 to the molding tool 3.

The material container 2 serves to hold loose foam particles. The material container 2 has a bottom 5, whereby it is connected to a compressed air source 7 via a compressed air line 6 in the bottom area. The compressed air line 6 is connected to several nozzles arranged in the bottom 5 (not shown), so that several air streams (=fluidizing air) can be introduced into the material container 2, which swirl the foam particles contained therein and thereby separate them.

In the area of the bottom 5 of the material container 2 there is an opening to which the delivery line 4 is connected. The opening can be closed with a slide (not shown).

Adjacent to the material container is a jet nozzle 8 in delivery line 4. The propellant nozzle 8 is connected to the compressed air source 7 by another compressed air line 9. Compressed air supplied to this propellant nozzle 8 serves as propellant air, as it enters the delivery line 4 through the propellant nozzle 8 and flows in the direction of the molding tool 3. This creates a vacuum at the nozzle 8 on the side facing the material container 2, which sucks foam particles out of the material container.

Delivery line 4 flows into a filling injector 10, which is coupled to molding tool 3. The filling injector 10 is connected to the compressed air source 7 via another compressed air line 11. The compressed air supplied to the filling injector 10 is used on the one hand to fill the molding tool 3 by applying the flow of foam particles by means of the compressed air in the direction of the molding tool 3. On the other hand, the compressed air supplied to the injector 10 can also be used to blow back the foam particles from the delivery line 4 into the material container 2 when the filling process at the molding tool 3 is completed.

Molding tool 3 consists of two molding halves 12, 13. There is at least one molding chamber 14 between the two halves of the molding tool, into which the filling injector 10 opens for the introduction of the foam particles. The volume of the molding chamber 14 can be reduced by closing the two molding halves 12, 13. When molding halves 12, 13 are moved apart, a gap is formed between the molding halves 12, 13, which is referred to as the crack gap. For this reason, such a molding tool 3 is also called a crack-gap molding tool.

Device 1 cannot have a steam generator and no steam supply to the molding chamber 14, as is usual with conventional devices for producing particle foam parts. Moisture can pass through the residual moisture contained in the material of the foam particles and through the moisture contained in the compressed air in molding chamber 14. However, device 1 may also be designed with a steam generator and a steam supply to molding chamber 14 and/or to delivery line 4 to supply saturated dry steam to molding chamber 14 for heating the foam particles and/or to wet foam particles on their transport from material container 2 to molding chamber 14. The foam particles in material container 2 can also be wetted with water in liquid form, with corresponding nozzles arranged in the material container 2 which atomize the water.

A capacitor plate 15, 16 is arranged on each of the molding halves 12, 13. These capacitor plates each consist of a well electrically conductive material, e.g. copper or aluminum. The filling injector 10 is arranged on the molding half 13. The filling injector 10 extends through a recess in the capacitor plate 16, which is mounted on the molding half 13.

The capacitor plates 15, 16 are connected to an AC voltage source 18 via electrical lines 17 for the transmission of high-frequency voltages.

The molding halves 12, 13 each have a base body which is made of an electrically non-conductive material which is essentially transparent to electromagnetic RF radiation, e.g. polytetra-fluoroethylene (PTFE), polyethylene, particularly UHMWPE, polyetherketone (PEEK). Only the capacitor plates 15, 16 are electrically conductive. The "substantially transparent material" is a material that can be penetrated by electromagnetic RF radiation. However, this material can be specifically designed with a certain absorption property for electromagnetic RF radiation to convert part of the electrical RF radiation into heat and thus heat the molding halves 12, 13. This will be explained more in detail further on.

The molding tool can optionally be connected to a vacuum pump 31, so that a vacuum or vacuum can be applied to the molding chamber 14. This negative pressure causes the moisture contained in the molding chamber 14 to be removed.

The capacitor plates 15, 16 are preferably equipped with a cooling device. In the present design example, the cooling device is formed by fans 32, which direct cooling air to the side of the capacitor plates 15, 16 facing away from the molding chamber 14. To increase the cooling effect, 15, 16 cooling fins 33 are provided on the capacitor plates.

Alternatively, or additionally, cooling lines can also be arranged on the capacitor plates 15, 16, through which a cooling medium is passed. The preferred cooling medium is a liquid, e.g. water or oil.

In the following, a process for producing particle foam parts with the device described above is explained:

The method comprises the following steps:
Filling the molding chamber 14
Fusing of the foam particles
Stabilize (optional)
Demolding
Cleaning of the tool (optional)

To fill the molding chamber 14, air is blown in via the compressed air line 6 in the area of the bottom 5 of the material container to swirl and separate the foam particles contained therein. At the same time, propellant air is also fed to the propellant nozzle, so that 2 foam particles are sucked from the material container into the delivery line 4 and transported with the propellant air in the direction of the molding tool 3. The molding chamber 14 is closed, whereby the molding halves 12, 13 can be completely collapsed or chambered apart with a crack gap.

The slide of material container 2 can be opened and closed in succession. Opening and shut-ter speeds typically range from 500 ms to 1 s. By this cyclic opening and closing of the slider, the foam particles are fed intermittently from the material container 2 to the delivery line 4. This can break up bridging of the foam particles in material container 2 and the foam particles are separated. This is particularly useful for foam particles with an adhesive surface, such as eTPU foam particles.

Alternatively, intermittent suction can also take place by an intermittent supply of the propellant air from the compressed air line 9 at the propellant nozzle 8 arranged directly adjacent to the material container 2.

Molding tool 12, 13 is equipped with at least one valve (not shown) which is open when foam particles are fed so that the compressed air flowing into molding chamber 14 can escape. When filling the molding chamber 14, this valve can be adjusted in such a way that a counterpressure forms in the molding chamber 14. This allows the pressure in the delivery line and in the molding chamber 14 to be maintained, which keeps the foam particles at a small volume. This allows more foam particles to be fed into the molding chamber 14 than would be possible without applying counterpressure. After the counterpressure is released, the foam particles expand in the molding chamber 14.

Another parameter for setting the filling quantity is the crack gap, i.e. the gap with which the two molding halves 12, 13 are chambered apart during filling. The use of a crack gap during filling mainly increases the density in the thin area of the particle foam part to be produced.

As soon as it is determined that the molding chamber 14 is filled with foam particles, the filling injector 10 is closed. The foam particles in the pipe are blown back into the material container 2 with the compressed air supplied to the filling injector 10.

The filling of molding chamber 14 with foam particles is described in detail in the German patent application DE 10 2014 117 332, which is why reference is made to this patent application.

After filling the molding chamber 14 with foam particles, they are heated by applying electromagnetic RF radiation. This RF radiation is generated by applying a high-frequency voltage of about $10^4$V with a frequency of 27.12 MHz to the capacitor plates 15, 16.

The foam particles can be based on polyurethane (eTPU). Polyurethane has a dielectric loss factor D of 0.2 at an electromagnetic radiation with a frequency of 1 MHz. The dielectric loss factor of polypropylene (PP) at an electromagnetic radiation with a frequency of 1 MHz is only 0.00035. The absorbency of polyurethane is therefore much higher than that of polypropylene. This makes it possible to introduce the heat necessary for fusing the foam particles into the molding chamber 14 without additional heat-transferring substances, especially aqueous solutions, since the foam particles themselves absorb the electromagnetic waves.

Instead of foam particles based on polyurethane, foam particles based on polyethylene block amide (PEBA) or based on polyethylene (PE) can also be used.

Foam particles based on ePP (expandable polypropylene) or ePS (expandable polystyrene) can also be fused to form particle foam parts. Since these materials absorb electromagnetic radiation only to a very small extent, it is necessary to add a dielectric heat transfer medium, such as water. The foam particles can be wetted with the heat transfer medium in material container 2 or during their transport from material container 2 to molding tool 3. Wetting in line 4 has the advantage that the foam particles are wetted very evenly and the heat transfer medium is distributed evenly in the molding chamber 14. This leads to a correspondingly even heating of the foam particles in the molding chamber 14.

Molding tool 3 can also be connected to a steam source (not shown) with which saturated dry steam can be fed into molding chamber 14. This is useful when fusing materials for which the electrical loss factor is temperature-dependent. Such materials are e.g. ePES (expandable polyether sulfone) or expandable polyamide. At low temperatures, the absorption property of electromagnetic waves is low. Therefore, these foam particles are first heated by steam and then heated to even higher temperatures alone or additionally by electromagnetic radiation above a certain temperature. Alternatively, the foam particles can be wetted with a dielectric heat transfer medium so that the electrical heat transfer medium is heated by electromagnetic radiation to heat the foam particles to a predetermined temperature. After-wards, the foam particles can be directly heated due to the electromagnetic radiation, as the absorption properties of electromagnetic radiation increase with increasing temperature.

The duration over which the electromagnetic RF radiation is applied depends on the volume of the molding chamber 14, the density of the foam particles and the applied electrical power or voltage. Tests have shown that, depending on the volume and the material from which the foam particles are formed, it takes about 30 s to about 2 min to fuse the foam particles reliably and completely. An electrical voltage of 5 kV to 20 kV was applied.

Preferably the temperature of the foam particles is measured during fusing and the electrical power is regulated accordingly. The electrical power is preferably controlled so that the foam particles have a temperature slightly above their softening temperature. Instead of the temperature of the foam particles, another physical quantity can also be measured, which is related to the electrical power introduced into the molding chamber. This can be, for example, the electrical voltage applied to the capacitor plates 15, 16.

The surface delimiting the molding chamber 14 can also be tempered. For this purpose, heating wires 34 can be arranged in the molding tool adjacent to the surface delimiting the molding chamber 14. The heating wires 34 are connected to a current source 35, with which a heating current can be fed into the heating wires.

Instead of heating wires, fluid channels can also be provided in the molding halves 12, 13 through which flows an appropriate temperature-controlled fluid. Preferably the fluid is water or steam.

After the application of the electromagnetic RF radiation, the molding chamber 14 is kept closed for a predetermined time, whereby the heat introduced is distributed evenly in the particle foam part and a very uniform fusing is formed between all foam particles. This process step is called stabilization. During stabilization, the particle foam part also cools slightly. Since the molding halves 12, 13 are made of a material that is essentially transparent to electromagnetic RF radiation, which is usually a plastic material that conducts heat poorly, little heat is emitted to the outside in the closed molding chamber 14.

Mold halves 12, 13 made of plastic have the advantage over molding halves made of metal that they insulate much better thermally and have a lower heat capacity. This allows the desired temperature cycles to be carried out much faster and with less energy, whereby the heat supplied is almost completely fed to the foam particles.

During the stabilization period or part of the stabilization period, the capacitor plates 15, 16 can be actively cooled by the cooling device 32, 33, whereby heat is extracted from the basic bodies of the molding halves 12, 13 and thus also from the particle foam part.

After stabilization, the particle foam part is demolded by moving the two molding halves 12, 13 apart. Demolding rods can be provided on the molding tool for demolding, with which the particle foam part is pushed out of one of the two molding halves 12, 13.

Stabilization is an optional process step. It can also be omitted for certain materials and shapes. The larger the volume of the particle foam part to be produced, the more practical it is to stabilize the particle foam part in the molding tool after fusing.

Electromagnetic RF radiation can be applied during the filling and/or closing of a crack gap to increase throughput.

The RF radiation can be applied during filling or only after filling the molding chamber 14 with foam particles, initially with low electrical power or low electrical voltage, to preheat the material to a certain temperature and then gradually or abruptly increase the electrical power or voltage.

It may also make sense to gradually increase the power or voltage of the RF electromagnetic radiation so that a ramp is executed over a period of, for example, 30 seconds to 3 minutes by the gradual increase in the electrical power or voltage of the RF electromagnetic radiation. This results in a very uniform heating of the foam particles.

Optionally, a negative pressure and/or vacuum can be applied to the molding chamber 14. This is useful if the foam particles and/or the supplied compressed air have a certain humidity.

The process described above is a dry process compared to fusing with steam alone. This ensures that the produced particle foam parts are dry after the production process and can be fed directly to further processing steps. It may also be advisable to remove the warm particle foam parts from the molding tool and feed them directly for further processing. For example, when manufacturing shoes, a midsole made of a particle foam part can be fused to a profile body made of another plastic material, whereby not as much energy needs to be supplied for fusing to the still warm or hot particle foam part as would be the case with a process working with steam alone, in which the particle foam part must be completely cooled and dried. This allows significant increases in efficiency to be achieved in production, since the breaks between individual process steps can be shortened and the heat introduced for fusing the foam particles can also be used at least in part for subsequent process steps.

In the following, different tools are explained which each have two molding halves 12, 13 and can be used in the device 1 described above. These tools are schematically simplified in FIGS. 2 to 6. The filling injector 10, thermometer for measuring the temperature in the molding chamber and other mechanical parts, such as holding elements, movement devices and the like for opening and closing the tool are omitted for easier graphic representation.

The molding tool 3 according to a second design example (FIG. 2) is again formed from two molding halves 12, 13, each of which has a base body consisting of an electrically non-conductive material which is essentially transparent, especially for electromagnetic RF radiation. This material is PTFE, PE, PEEK or another material that is essentially transparent to RF radiation. The molding halves 12, 13 define a molding chamber 14. In this design example, the molding chamber 14 has delimiting surfaces 19, which have a contoured shape that deviates from a flat surface. The molding halves 12, 13 each have a flat outer surface 20 on which a capacitor plate 15, 16 is arranged. The chamber between the contoured delimiting surfaces 19 and the outer surfaces 20 is filled by the essentially transparent material. The capacitor plates 15, 16 are flat. With this molding tool 3 three-dimensional contoured particle foam parts can be produced, whereby the shape of the particle foam part is defined by the inner delimiting surfaces 19 of the molding halves 12, 13. Such a molding tool 3 is particularly suitable for producing small particle foam parts with essentially uniform density.

Figure 7A:
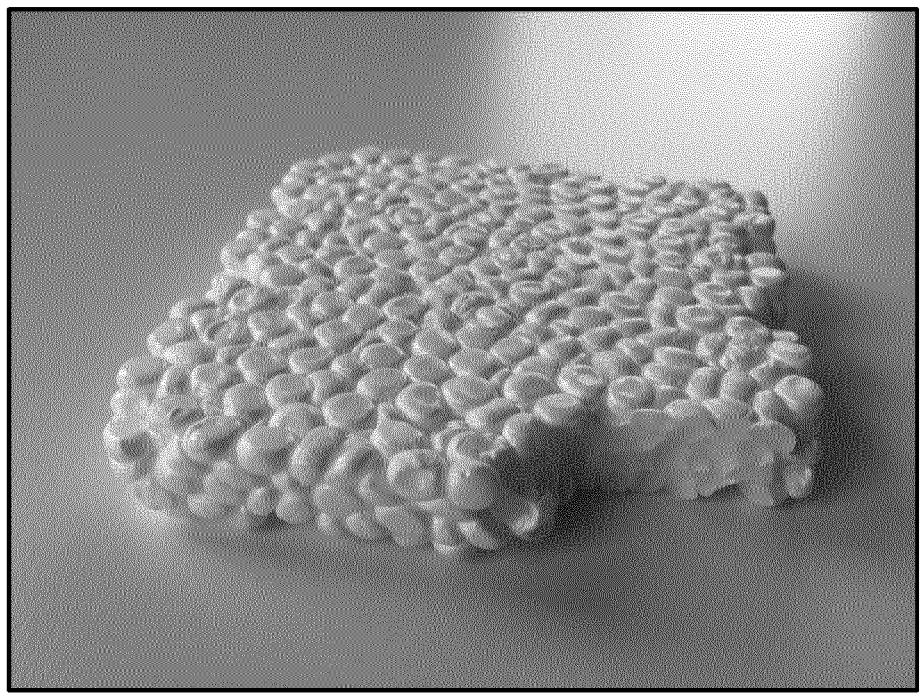
Figure 7B:
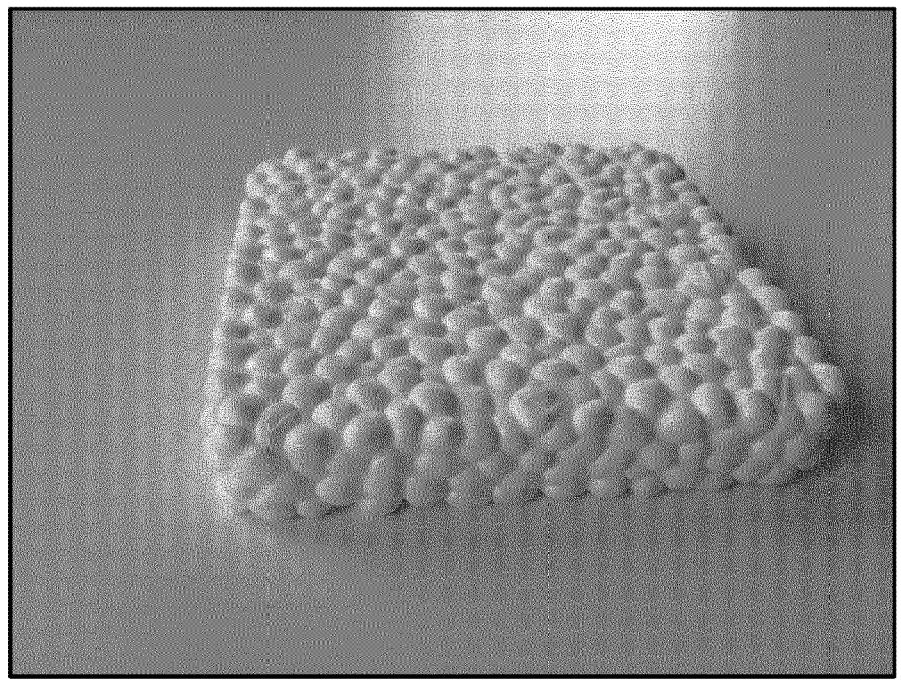
Figure 7C:
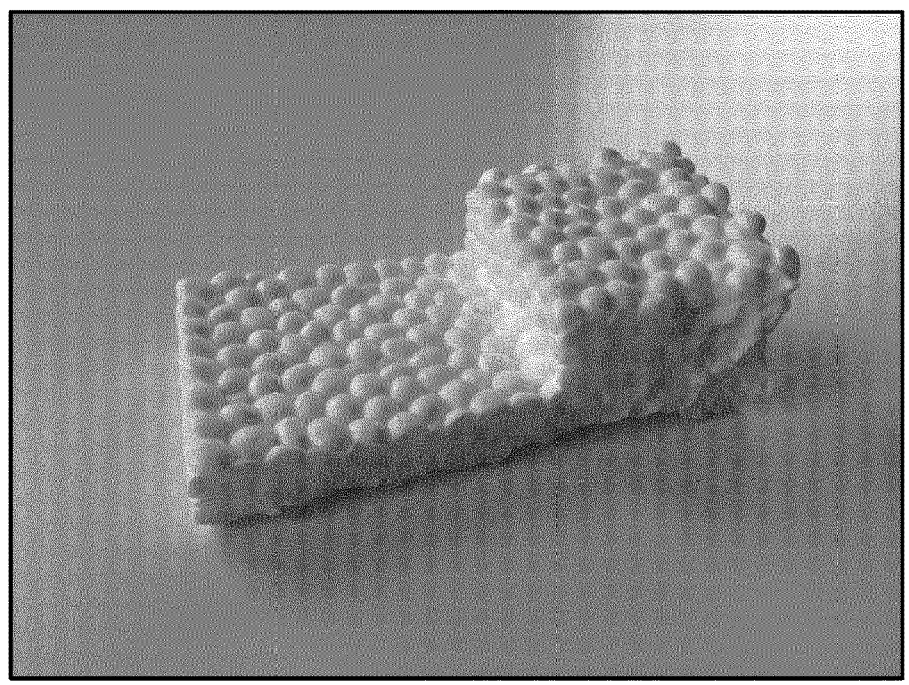
Figure 7D:
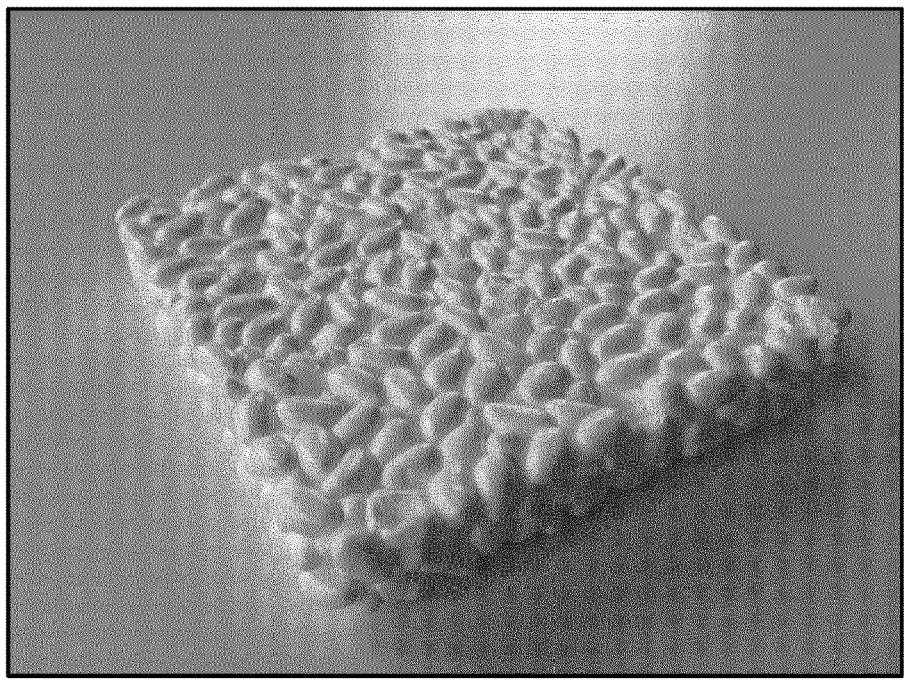
Figure 7E:
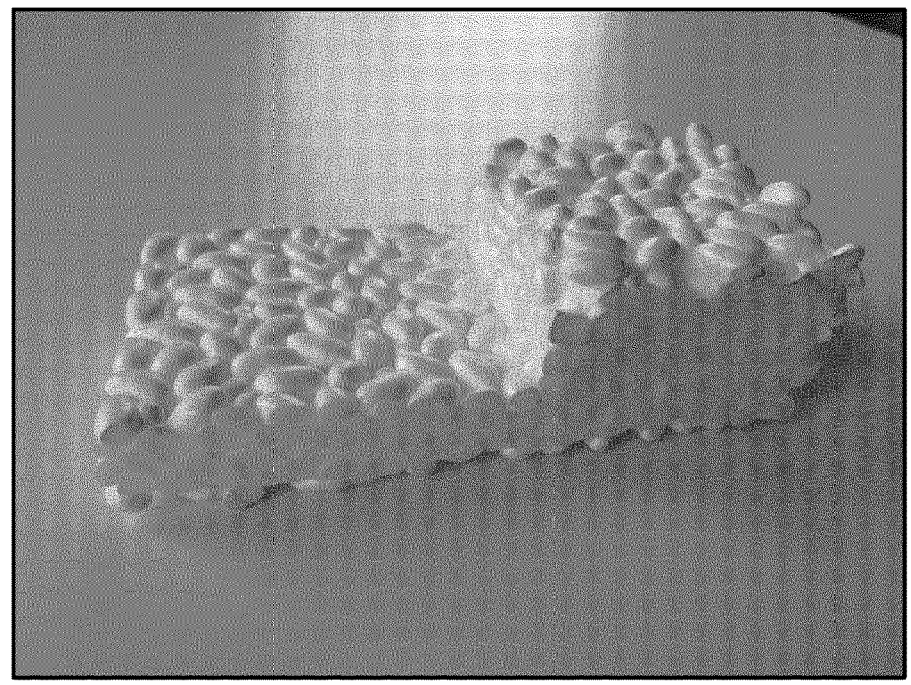
Figure 7F:
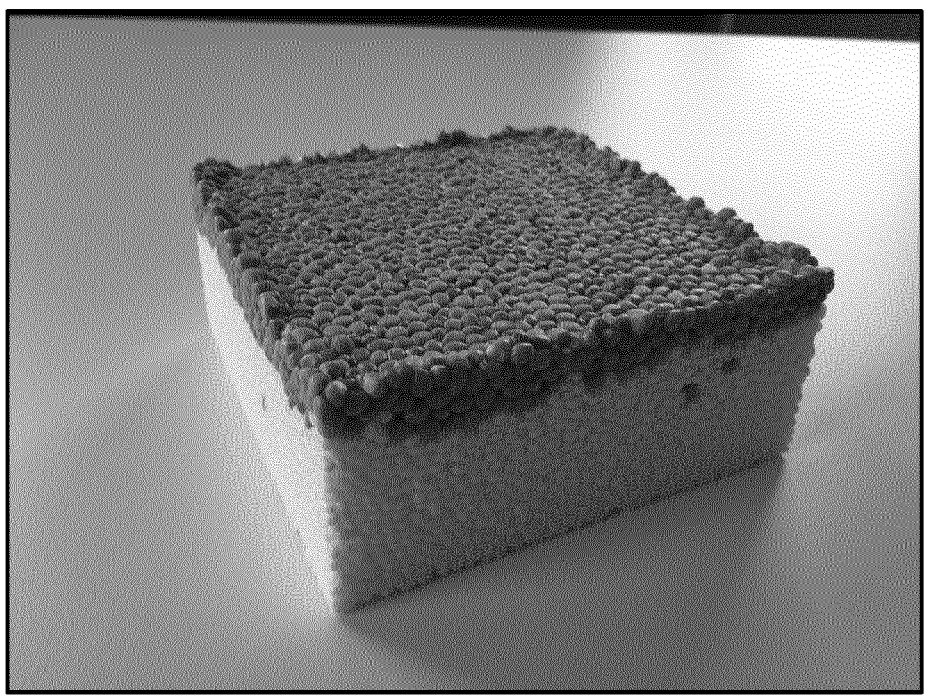
Figure 7G:
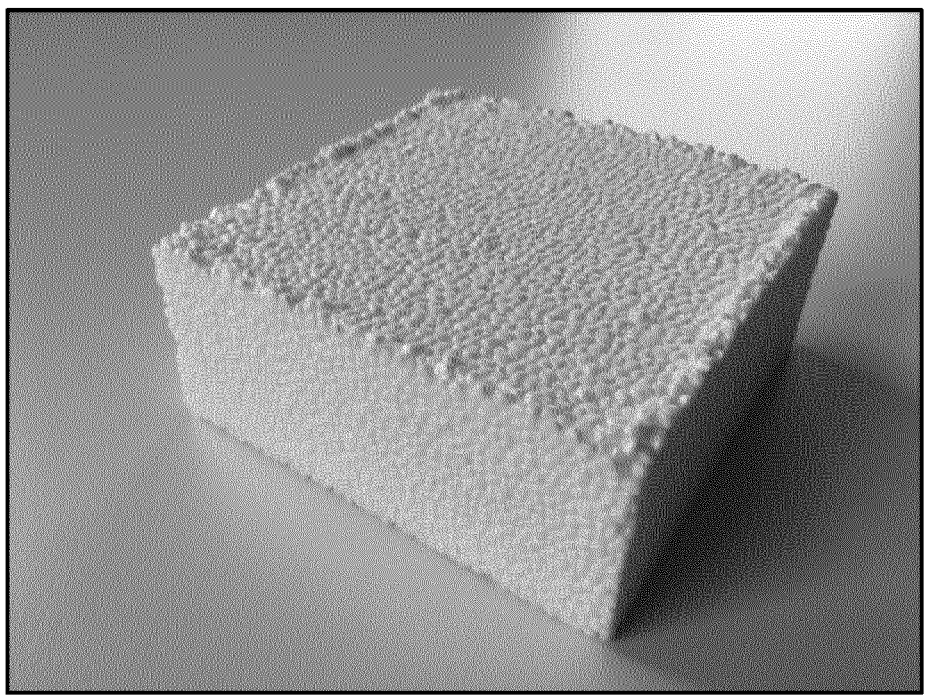
Figure 7H:
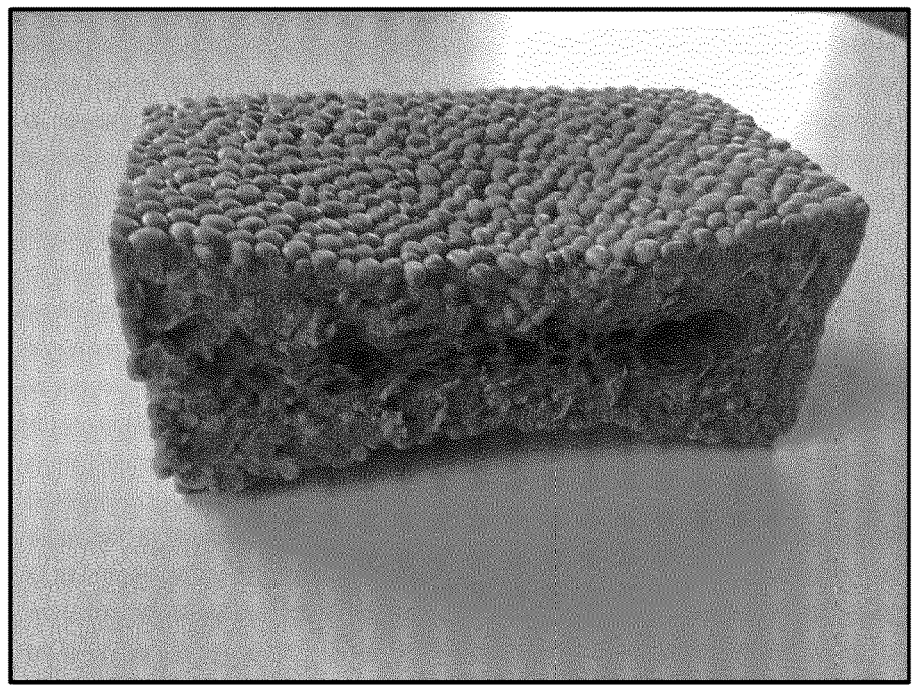
Figure 7I:
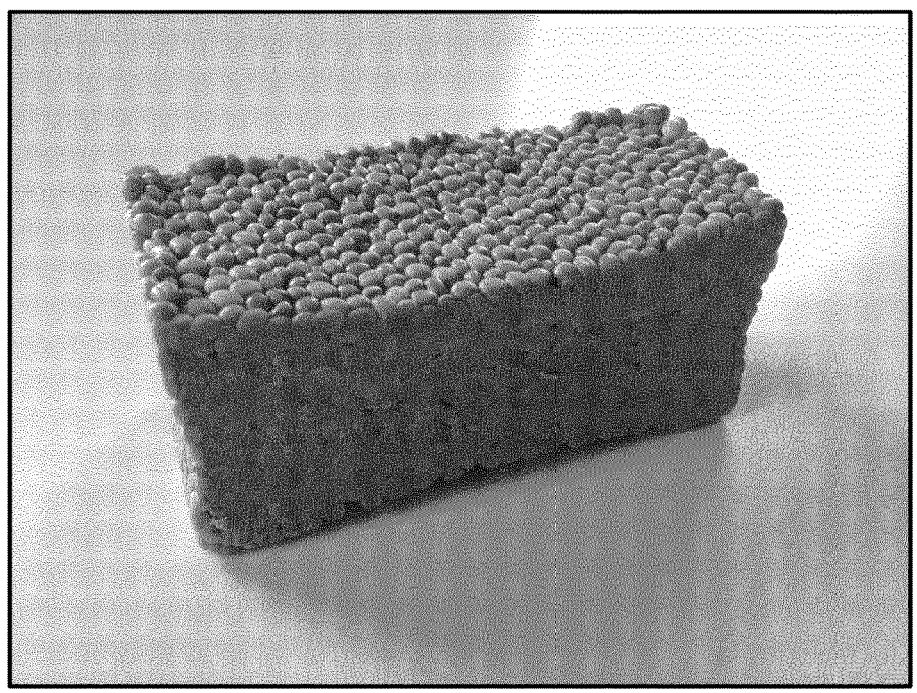

The problem with large or thick particle foam parts is that they heat up more in the middle than in the edge area, which can destroy the particle structure. FIG. 7h shows a particle foam part made of polylactate (PLA) with a thickness of about 5 cm, which has been heated with RF radiation over a period of 120 seconds. The RF radiation was applied with a frequency of 27.12 MHz and a voltage of 9 kV. Since the material itself absorbs the electromagnetic waves and is a poor heat conductor, the central area of the particle foam part heats up more strongly than the edge area which is in contact with molding tool 3 and is heated more slowly by the relatively cool molding tool compared to the central area. This can lead to a complete melting of the foam particles in the central area of the particle foam part (FIG. 7h). To avoid this, less energy can be used. FIG. 7e shows a corresponding particle foam part cut in the middle, which has been produced in the same way as the particle foam part shown in FIG. 7h, but here the RF radiation has only been applied for a period of 90 seconds. The central area of the particle foam part is homogeneously fused. The particles adhere to the edge area but could be fused together somewhat more strongly.

Preferably, the substantially transparent material is a material that has the same or similar loss factor as the expandable polymer material to be fused, so that the mold and the foam particles in the molding chamber 14 heat uniformly when electromagnetic radiation is applied. Such a design allows a free contouring of the delimiting surfaces 19, since the absorption of heat does not depend on the local thickness or density of the particle foam part to be produced.

Figure 7J:
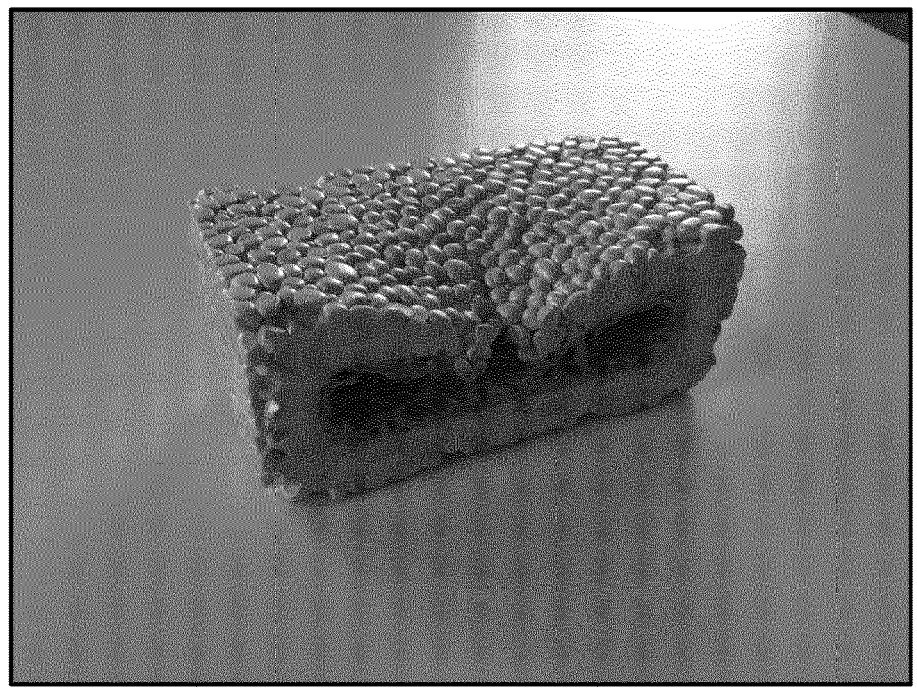
Figure 7K:
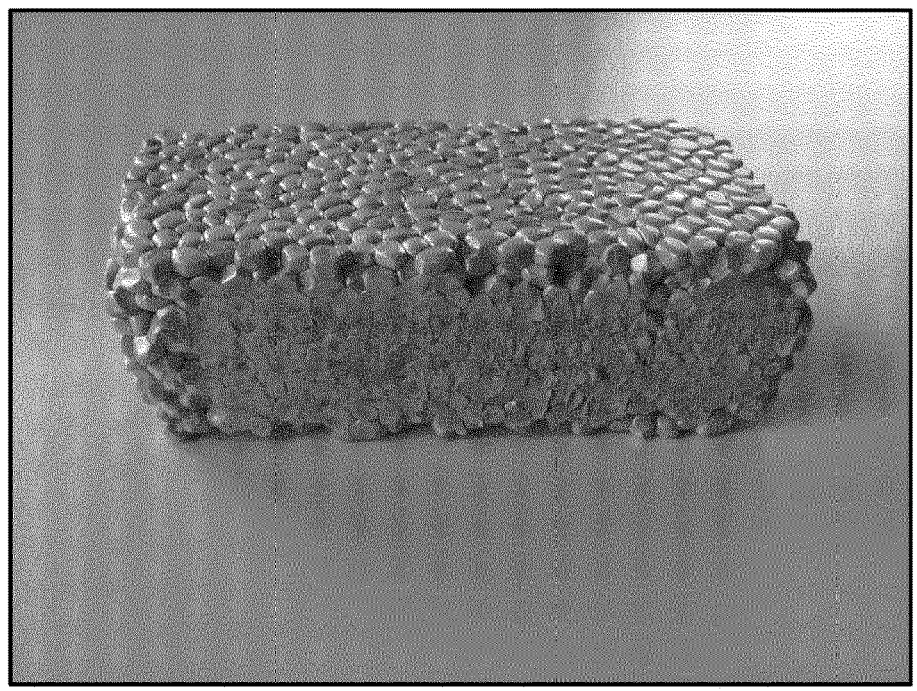

FIGS. 7j and 7k show corresponding images of cut particle foam parts made of polyethylene terephthalate (PET). The RF radiation was applied here for a duration of 300 s with a frequency of 27.12 MHz, whereby the voltage at the particle foam part shown in FIG. 7j was 10 kV and at the particle foam part shown in FIG. 7k 7.5 kV. The particle foam part shown in FIG. 7j has a destroyed central particle structure, whereas the central area of the particle foam part shown in FIG. 7k is homogeneously fused.

To avoid unequal heating of the central area and the edge area of a particle foam part, the molding tool 3 can be tempered and/or additional heat can be supplied to the foam particles in the molding chamber 14 at the edge area.

For tempering molding tool 3, molding halves 12, 13 can be designed with fluid channels through which a fluid is passed which is tempered to approximately the softening temperature of the material in molding chamber 14. Alternatively, or additionally, 3 heating wires can be provided for tempering the molds, as described above. As a result, no heat flows from the foam particles into molding tool 3 when the foam particles are heated, so that the foam particles are heated uniformly throughout molding chamber 14. It may even be appropriate to heat the molding tool 3 to a temperature slightly above the temperature set in the foam particles to fuse them by introducing RF radiation to ensure reliable fusing of the particle foam part in the surface area. Tempering of molding tool 3 can also be carried out before fusing with RF radiation.

Figure 3:
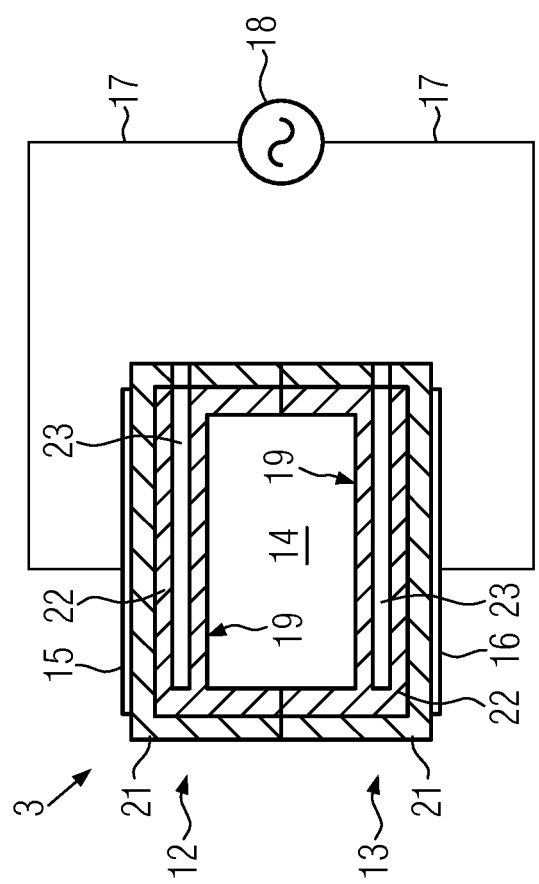

FIG. 3 shows another example of a molding tool 3, which in turn consists of two molding halves 12, 13. A capacitor plate 15, 16 is arranged on flat outer surfaces 20 of the molding halves 12, 13.

The molding halves 12, 13 are made of two parts: an outer non-porous shell wall 21 and an inner porous molding tooled body 22. The porous molding tooled bodies 22 define the inner delimiting surface 19 to delimit the molding chamber 14. On the sides facing away from the inner delimiting surface 19, the shaped bodies 22 are positively surrounded by the shell wall 21. The molding halves 12, 13 each have one or more channels 23, which each open at the shell wall and extend into the porous molding tooled bodies 22 and end there. A hot medium can be introduced through the channels 23 into the molding halves 12, 13, which is distributed in the porous molding tool body 22 and partly enters the molding chamber 14. On the one hand this heats the foam particles in the edge area of molding chamber 14 directly through the medium and on the other hand the molding halves 12, 13, particularly their porous molding tooled bodies 22, are also heated. Hot gases, particularly, hot air or steam, can be used as media.

To cool the molding tool or the particle foam part produced in it, it may also be advisable to introduce a cool medium into the channels 23 and thus into the molding chamber 14. A medium is cool if it is colder than the molding halves 12, 13 or colder than the particle foam part in the molding chamber 14. This can accelerate the stabilization of the particle foam part.

Both the jacket wall and the shaped bodies 22 are made of materials that are essentially transparent to RF radiation such as polytetrafluoroethylene (PTFE), polyethers, particularly UHMWPE, polyetheretherketone (PEEK). The shaped bodies 22 are produced, for example, by sintering a granulate from one of these materials.

Figure 4:
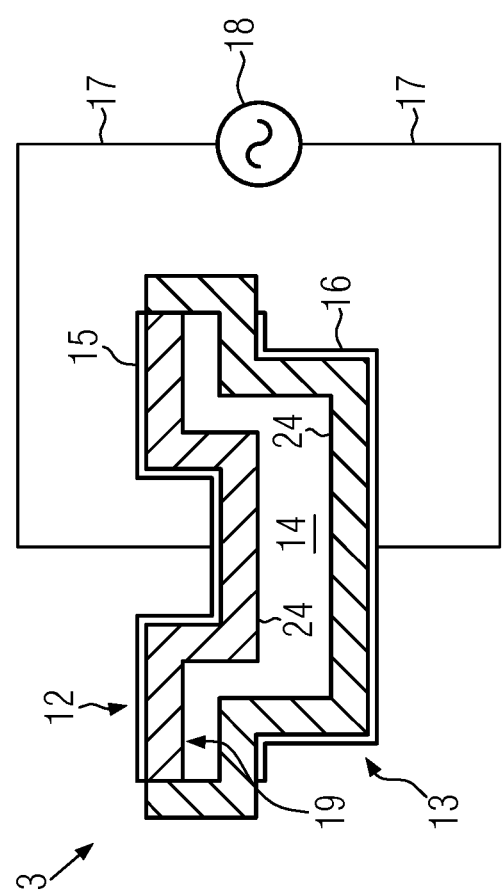

Another alternative to tempering the inner delimiting surfaces 19 of molding tool 3 is to provide the inner delimiting surfaces 19 with a layer of a material that is not transparent to RF radiation. This layer is referred to below as passive heating layer 24 (FIG. 4). The passive heating layer can be made of a temperature-stable material that is not transparent to RF radiation. Other suitable materials for such a passive heating layer 24 are ferrites. When RF radiation is applied, the passive heating layer 24 heats up and releases the heat to the adjacent foam particles.

Materials with a moderate loss factor, such as PET (polyethylene terephthalate), PEEK (polyether ether ketone), polyoxymethylene (POM), polyimide and polymethyl methacrylate (PMMA) can also be used as passive heating layer 24. Polyoxymethylene has a dielectric loss factor D of about 0.008 and polymethyl methacrylate (PMMA) of about 0.02. These heating layers are essentially transparent to electromagnetic radiation, since they absorb only a small proportion and, due to the relatively low loss factor, should be provided with a certain thickness which is preferably at least 2 mm, particularly at least 2.5 mm and particularly at least 5 mm. Such a heating layer can also have a thickness of 10 mm or more. Such heating layers can also be formed as separate plates, which are arranged adjacent to the inner delimiting surfaces 19 of the molding halves 12, 13.

PET, PMMA and POM are mainly used for molding tools intended for fusing ePE, eTPU or ePS. The fusing temperature is between 120° C. and 130° C. ePP or ePS can also be fused with a PET tool, where the fusing temperature is about 160° C.

At high fusing temperatures of e.g. 250° C., a heat-resistant tool made of PEEK or polyimide (PI) can also be used. A heat-resistant tool can also be made of ceramic, preferably with a coating. The coating can be a heat-resistant plastic material. Such a heat-resistant tool can be used, for example, to fuse ePES (expandable polyether sulfone).

The melting temperature of POM is about 175° C. Therefore, a tool made of POM is not suitable for fusing materials with a fusing temperature of 160° C. or more.

The material of the tool is selected regarding the material to be fused with regard to the fusing temperature and the electrical loss factor. The melting temperature of the tool material should be higher than the fusing temperature. The electrical loss factor of the tool material can be equal to or lower than that of the material to be fused. The higher density of the tool material must be taken into consideration.

The heating layer 24 can not only be provided at the delimiting surfaces 19 adjacent to the capacitor plates, but also at all delimiting surfaces 19 of the molding halves 12, 13, so that they completely surround the particle foam part to be formed. The same also applies to the other heating and tempering devices mentioned above, such as temperature channels or heating wires.

The molding halves 12, 13 can also be made entirely of a substantially transparent material with a low dielectric loss factor D, so that the molding halves 12, 13 heat up when electromagnetic radiation, particularly RF radiation, is applied.

The different possibilities for tempering the inner delimiting surfaces 19 listed above can also be used in combination in one molding tool.

The design examples of molding tool tools 3 explained above each have flat capacitor plates 15, 16. Following a further design form of molding tool 3, these can be designed in such a way that the capacitor plates 15, 16 are adapted to the shape of the particle foam part or molding chamber 14 to be produced. The design example shown in FIG. 4 shows two molding halves 12, 13, whose inner delimiting surfaces 19 define a stepped molding chamber 14. The outer surfaces 20 are adapted to the contour of the corresponding inner delimiting surfaces 19 of the respective molding tool half 12, 13. In other words, the inner delimiting surfaces 19 are mapped onto the respective outer surfaces 20 of the mold halves 12, 13, whereby the mold 3, for example, is formed with a uniform thickness by which the outer surface 20 is offset from the inner delimiting surface 19. On the outer surface 20, preferably small structures of the inner delimiting surface 19 are smoothed.

On the outer surfaces 20 the capacitor plates 15, 16 are designed as an electrically conductive layer and have essentially the same shape or contour as the corresponding outer surface 20 of the respective molding tool half 12, 13.

Since the capacitor plates in the molding tool are adapted to the particle foam parts to be produced or to the molding chamber 14, the distance between the opposing capacitor plates is approximately the same everywhere, which means that the distance between the opposing capacitor plates 15, 16 can be kept small, so that a high electric field strength is achieved at relatively low voltage.

Such a formal adaptation of the capacitor plates to the shape of the particle foam parts to be produced is particularly useful for shell-shaped particle foam parts. Such shell-shaped particle foam parts are, for example, boxes or sphere-shaped shells. If such a box were to be formed between two flat capacitor plates, the distance between the capacitor plates would have to be so large that the entire case would have chamber between them. The distance between the two capacitor plates can only be slightly greater than the thickness of the wall of the particle foam part when the capacitor plates are adapted to the shape. Such a formal adaptation of the capacitor plates therefore makes it possible to produce large-volume, particularly shell-shaped particle foam parts, while keeping the requirements for the voltage source low to provide a sufficient electrical field for fusing the foam particles.

The problem with particle foam parts of different densities is that the areas with higher density absorb more heat than the areas with lower density. Areas of higher density are created, for example, in the cracking gap process in which the two molding halves 12, 13, after they have already been filled with foam particles, are pressed together a bit, whereby the foam particles contained therein are compressed. The thin areas of the molding chamber 14 are compressed more strongly relative to the thicker areas, since the displacement path is the same in all areas. This causes the foam particles in the thinner areas to be compressed more strongly.

Figure 5:
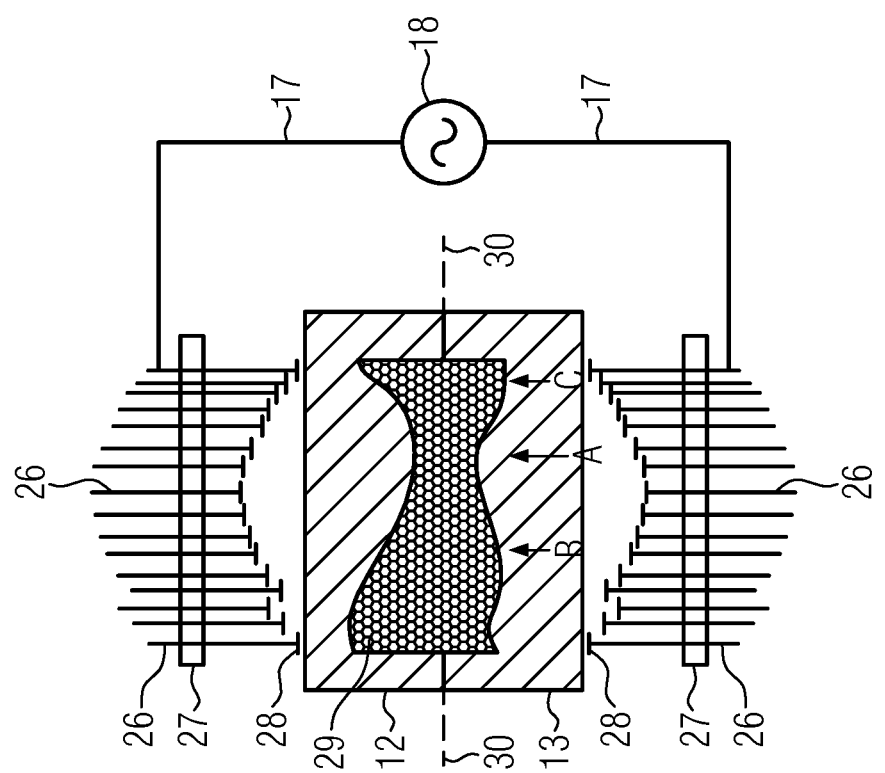

FIG. 5 shows an example of a molding tool 3 in which the capacitor plate 15, 16 are divided into several segments 25, whose distance to the molding chamber 14 is individually adjustable. In this design example, the segments 25 of the capacitor plates 15, 16 are each small square plates, each coupled to a segment rod 26. The segment rods 26 are connected to the AC voltage source 18 and are in electrical contact with the respective electrically conductive plates forming the capacitor plates 15, 16.

The segment rods 26 are slidably arranged in a holder 27, in which they can be fixed in a predetermined position. The holder 27 can be designed in such a way that the segment rods 26 can be detachably fixed, whereby segment rods 26 and thus the capacitor plates 28 can be fixed in different positions. However, the brackets 27 can also be designed to fix the segment rods 26 once. Such supports 27 can, for example, be formed from a potting body which surrounds the segment rods 26 at least in certain areas and is poured out in a predetermined desired arrangement after arrangement of the segment rods 26 and the capacitor plates 28. Such once-fixable capacitor plates 15, 16 are mainly used for particle foam parts, which are produced very often or in large quantities and for which the corresponding tool is repeatedly used. The capacitor plates 15, 16 are then assigned to the corresponding molding halves 12, 13, with which they are used together repeatedly.

The greater the distance between the sections of the capacitor plates 15, 16, the smaller the electric field generated between the respective sections. Therefore, the capacitor plates 28, which are arranged to areas of the molding chamber 14, in which the foam particles are present in high density during the production of a particle foam part with a greater distance to the molding chamber than in the areas, in which the foam particles are present with low density. This can compensate for the higher density areas absorbing more heat than the lower density areas, so that the foam particles are heated evenly in the mold chamber 14.

The molding tool 3 shown in FIG. 5 is a crack-gap molding tool filled with chambered molding halves 12, 13 with foam particles 29. After filling molding tool 3, the two halves of the molding tool 12, 13 are pressed together, whereby the foam particles 29 located in molding chamber 14 are compressed. The molding chamber 14 shown in FIG. 5 has different thicknesses in cross-section, whereby the thickness in area A is a bit smaller than in areas B and C. As a result, the foam particles 29 are compressed more strongly in area A than in areas B and C, which gives them a higher density in area A than in areas B and C. The foam particles 29 have a higher density in area A than in areas B and C. Therefore, the capacitor plates 28, located adjacent to region A or facing region A, are located further away from a central plane 30 than the capacitor plates 28 facing regions B and C, respectively. The center plane 30 is arranged approximately centrally between the two capacitor plates 15, 16.

Since the invention heats the foam particles primarily by direct absorption of RF radiation, i.e. that the heat is not or only to a small extent absorbed by a heat-transferring medium that absorbs the RF radiation and releases it to the foam particles, the temperature in the molding chamber cannot be controlled by parameters that act on a heat-transferring medium. In the state of the art, for example, it is known to use water as heat-transferring medium and to regulate the temperature in the molding chamber by adjusting the pressure. Due to the predominantly direct absorption, the foam particles can become as hot as desired and heat up to different degrees in different densities.

The basic aim is to heat the foam particles in the molding chamber as evenly as possible, provided that they are made of the same material. By shaping the electric field with areas of different intensity or field strength by varying the distance of the capacitor plates 15, 16 section by section to the molding chamber 14 or to the central plane 30, an even heating of the foam particles can be achieved in the molding chamber 14, even if they are arranged there with different density. Therefore, it may be advantageous to provide capacitor plates 15, 16 with a non-planar configuration.

Figure 6:
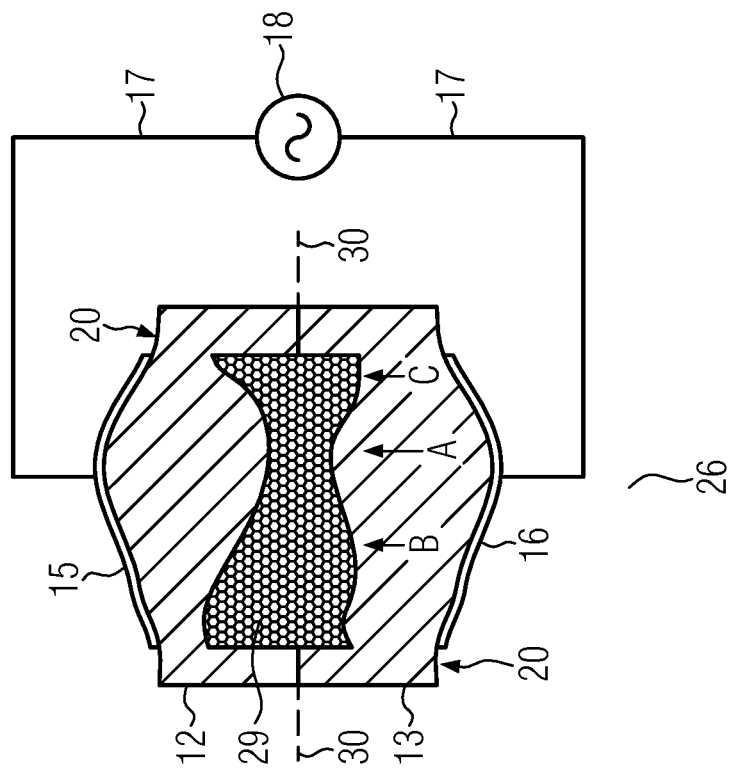

In the design example shown in FIG. 5, the capacitor plates 15, 16 are segment-shaped and made of capacitor plates 28, the position of which can be individually determined. FIG. 6 shows another type of molding tool 3, in which the molding halves 12, 13 are formed with similar inner delimiting surfaces 19 as in the type shown in FIG. 5. This molding tool 3 is characterized by the fact that the outer surfaces 20 have a contoured shape, so that sections of the outer surface 20 are chambered at different distances from the central plane 30. The capacitor plates 15, 16 are mounted on the contoured outer surfaces 20, whereby their shape is adapted to the contoured outer surfaces 20. The capacitor plates 15, 16 can, for example, be produced by an electrically conductive coating which is applied to the outer surfaces 20 of the molding halves 12, 13. The capacitor plates 15, 16 can also be designed as flexible sheet metal parts, which consist of an electrically well conducting metal or an electrically well conducting metal alloy and are adapted in the form to the outer surface 20 and are glued to the outer surfaces.

In this design 30, as in the design shown in FIG. 5, sections of the capacitor plates 15, 16 are also chambered at different distances from the central plane 30 or from the molding chamber 14, whereby 14 areas with different electric field strengths are generated in the molding chamber. In areas with higher compression of the foam particles 29 (A) the distance of the opposite sections of the capacitor plates 15, 16 is greater than in areas B, C, in which the compression of the foam particles 29 is lower. The distance of the individual sections of the capacitor plates 15, 16 to the center plane 30 is approximately proportional to the density of the foam particles 29 in the areas between the opposite sections of the capacitor plates 15, 16. The proportionality factor differs between the different materials and depends on their absorption capacity of the RF radiation.

Molding tool 3 for producing large particle foam parts can have several separate segments of capacitor plates 15, 16. It is advisable that the capacitor plates are in no direction greater than a quarter of the wavelength of the RF radiation. At a frequency of 27.12 MHz, the wavelength λ is about 11 meters. The maximum extension of the segments of the capacitor plates should therefore not exceed about 2.75 meters. In practice it has been shown that capacitor plates up to a size of about two meters generate a very uniform electric field at a frequency of 27.12 MHz. If the capacitor plates are larger than λ/4, the radiation of the individual points of the capacitor plates is different and they no longer emit synchronously. For capacitor plates larger than λ/4, it is advisable to provide distributed inductances on the capacitor plate, each of which forms an LC element. This allows the synchronicity of the vibrations of the different sections of the capacitor plates to be restored. However, the provision of such LC elements is very complex. It may therefore be more expedient to divide the capacitor plates into separate sections which are supplied with an AC voltage independently of one another.

FIGS. 7a to 7k show pictures of particle foam parts, some of which have been cut, fused with RF radiation without heat-transferring medium and without additional temperature control of the molding tool made of foam particles. The following table shows the parameters of the voltage U, the duration t, the electrical loss factor D at 1 MHz and room temperature, the designation of the material and the reference to the figure.

| FIG. | Materials | U[kV] | t[s] | D |
|---|---|---|---|---|
| 7a | ePEBA | 7.5 | 50 | 0.12 |
| 7b | eTPU | 7.5 | 25 | 0.112 |
| 7c | eTPU | 7.5 | 50 | 0.112 |
| 7d | eTPU | 9 | 30 | 0.112 |
| 7e | eTPU | 9 | 60 | 0.112 |
| 7f | PLA | 9 | 70 | <0.1 |
| 7g | PLA | 9 | 70 | <0.1 |
| 7H | PLA | 9 | 120 | <0.1 |
| 7I | PLA | 9 | 90 | <0.1 |
| 7y | PET | 10 | 300 | 0.014-0.048 |
| 7K | PET | 7.5 | 300 | 0.014-0.048 |

It has been shown that all materials ePEBA (polyether block amides), eTPU (expanded thermoplastic polyurethane), PLA (polylactate) and PET (polyethylene terephthalate) can be well fused by RF radiation alone. In the example shown in FIG. 7g, a particle foam part was produced from two differently dense foam particles. The foam particles in FIG. 7g above are dark-colored and have a lower density than the foam particles below, since the dark-colored foam particles are coarser-grained than the light-colored foam particles.

The above examples show that the ingenious process can be used to process a wide variety of materials. PET is 100% recyclable. PET is obtained in large quantities at low cost from a recycling process. PET has so far been the preferred material for plastic beverage bottles. It is also very hard and allows the production of particle foam bodies with similar properties to particle foam bodies made of expanded polypropylene (ePP).

PLA is also 100% recyclable, fully biodegradable and has mechanical properties such as expanded polystyrene (ePS) particle foam parts. Initial measurements have shown that PLA has a dielectric loss factor in the range of about 0.1 to 0.01. Exact measurements are not yet available. PLA has a softening temperature of approx. 100° C. In comparison, the softening temperature of eTPU is about 125° C. to 130° C. and that of polyethylene terephthalate about 200° C. to 260° C.

ePEBA is very light and highly elastic. It has similar properties to particle foam parts made of expanded thermoplastic polyurethane.

LIST OF REFERENCE SIGNS

1 Device
2 material containers
3 Molding tool
4 Management
5 Floor
6 Compressed air line
7 Compressed air source
8 Jet nozzle
9 Compressed air line
10 Filling injector
11 Compressed air line
12 Molding half
13 Molding half
14 Molding chamber
15 Capacitor plate
16 Capacitor plate
17 Electrical cable
18 AC voltage source
19 Delimiting surface (inside)
20 Outer surface
21 Jacket wall (non-porous)
22 Shaped body (porous)
23 Channel
24 passive heating layer
25 Segment
26 Segment rod
27 Mounting
28 Capacitor plates
29 Foam particles
30 Center plane
31 Vacuum pump
32 Fan
33 Cooling fin
34 Heating wire
35 Power source

The invention claimed is:

1. A method for producing a particle foam part, the method comprising:
heating foam particles, which are formed from an expandable thermoplastic polymer material, in a molding chamber of a molding tool, welding the foam particles into the particle foam part, the foam particles being heated by electromagnetic radiation,
wherein the foam particles are heated to a temperature of at least 160° C., wherein the foam particles are first preheated to a predetermined temperature and then heated at the predetermined temperature by direct absorption of the electromagnetic radiation by the foam particles to a higher temperature.

2. The method according to claim 1, wherein the foam particles are heated to a temperature of at least 180° C.

3. The method according to claim 1, wherein the foam particles are preheated by heating a dielectric heat transfer medium that is together with the foam particles in the molding chamber, supplying steam to the molding chamber, and/or heating the molding tool with a separate heater.

4. The method according to claim 1, wherein a device for producing a particle foam part is used, the device comprising a molding tool delimiting a molding chamber, at least two capacitor plates adjacent to the molding chamber, wherein the at least two capacitor plates are connected to a radio frequency (RF) radiation source, the RF radiation source configured to emit RF radiation, and wherein the molding tool is tempered in the region of an inner delimiting surface delimiting the molding chamber and/or a heating medium is supplied to the region of the molding tool adjacent to the inner delimiting surface.

5. The method according to claim 4, wherein the molding tool comprises a porous molding body which forms at least part of the inner delimiting surface and is communicatively connected to a device for supplying a heating fluid.

6. The method according to claim 4, wherein the molding tool has at least one channel for supplying or passing through a heating fluid.

7. The method according to claim 4, wherein the molding tool is provided on its inner delimiting surface with a passive heating layer made of a material which is not transparent to RF radiation and/or an electrical heating device.

8. The method according to claim 7, wherein the passive heating layer is formed from a ferrite or a plastic material.

9. The method according to claim 4, wherein the tool is made of polyethylene terephthalate, polyoxymethylene, polyether ether ketone, polymethyl methacrylate, polyimide or ceramic.

10. The method according to claim 4, wherein the capacitor plates of the molding tool are adapted to the contour of inner delimiting surfaces of the molding tool.

11. The device for producing a particle foam part according to claim 4, wherein the capacitor plates have a three-dimensionally contoured shape, wherein a portion of the capacitor plates facing a region of the molding chamber in which the foam particles are more densified in use than in another region are further away from the molding chamber as a portion of the capacitor plates facing a region of the molding space in which the foam particles are less densified.

12. The device for producing a particle foam part according to claim 4, wherein the capacitor plates are each formed from a plurality of segments which are repeated or can be set independently of one another at a distance from the molding chamber.

13. The device for producing a particle foam part according to claim 4, wherein the RF radiation source is designed to emit RF radiation having a frequency of at least 1 MHz and a maximum of 100 MHz.

14. The device for producing a particle foam part according to claim 4, wherein the molding tool is formed from a material which is substantially transparent to electromagnetic RF radiation.

15. The device for producing a particle foam part according to claim 4, wherein the capacitor plates are planar.

16. The device for producing a particle foam part according to claim 4, wherein the molding tool has different thicknesses in a region between the respective capacitor plates, the molding chamber being delimited by three-dimensionally contoured inner delimiting surfaces.

17. The method according to claim 1, wherein the molding tool is at least to an area adjacent to the molding chamber formed of a material having an electrical loss factor based on the electrical loss factor of the expandable polymer material.

18. The method according to claim 17, wherein the electrical loss factor of the expandable polymer material and of the material of the molding tool differ by a maximum of 20%.

19. The method according to claim 17, wherein the molding tool has different thicknesses in a region between the respective capacitor plates, the molding chamber being delimited by three-dimensionally delimited inner delimiting surfaces.

20. The method according to claim 1, wherein an electrical loss factor of the foam particles is temperature-dependent.

21. The method according to claim 1, wherein the foam particles are preheated to increase an electrical loss factor of the foam particles so that the foam particles are then heated by the direct absorption of the electromagnetic radiation to the higher temperature.

22. The method according to claim 1, wherein the expandable polymer material is ePES (expandable polyether sulfone) or expandable polyamide.

23. The method according to claim 1, wherein the expandable polymer material is polyethylene block amide (PEBA) or based on polyethylene (PE).

24. The method according to claim 1, wherein the expandable polymer material is ePEBA (polyether block amides), eTPU (expanded thermoplastic polyurethane), PLA (polylactate) or PET (polyethylene terephthalate).

\* \* \* \* \*